Feb. 23, 1932.  E. HIRVONEN  1,846,108

BRAKE MECHANISM

Original Filed April 26, 1923  2 Sheets-Sheet 1

Inventor.
Eith Hirvonen
by
[signature]
atty

Feb. 23, 1932.    E. HIRVONEN    1,846,108
BRAKE MECHANISM
Original Filed April 26, 1923    2 Sheets-Sheet 2

Patented Feb. 23, 1932

1,846,108

UNITED STATES PATENT OFFICE

ERIK HIRVONEN, OF DETROIT, MICHIGAN, ASSIGNOR, BY MESNE ASSIGNMENTS, TO BENDIX BRAKE COMPANY, OF SOUTH BEND, INDIANA, A CORPORATION OF ILLINOIS

BRAKE MECHANISM

Refile for abandoned application Serial No. 634,822, filed April 26, 1923. This application filed January 27, 1925. Serial No. 5,129.

This invention relates to a brake mechanism comprising a rotatable brake member, as a drum or disc, and a stationary brake member, as a brake shoe, having a friction face adapted to engage said rotatable member and restrict its motion, and is particularly adaptable to automobile brakes, although not necessarily limited to such use.

The usual type of brake comprises a rotatable drum and a band or shoe which is adapted to be forced by suitable actuating means into frictional engagement with the rotatable drum. With such construction, the braking effort is more or less proportional to the brake-actuating force.

An object of this invention is to provide an improved brake mechanism wherein the energy of the rotating brake member is or may be utilized to increase the brake effect of the brake mechanism over and above the force exerted by the brake-actuating means to move the complementary parts of the brake mechanism into braking engagement with each other.

The brake mechanism arranged to accomplish the above object may comprise a rotatable drum and a pivoted brake shoe which is adapted to be moved into frictional engagement with the brake drum. Said brake shoe may be sectional, or may include a second brake shoe which may be pivoted to the first brake shoe and arranged to be moved manually or otherwise into engagement with the rotating drum. The rotation of the drum tends to carry said second brake shoe with it and consequently said shoe is forced against the first brake shoe and therefore may move it with relatively great force into frictional engagement with the brake drum. With this arrangement, the braking effect is or may be due mainly to the energy supplied by the rotatable drum.

With a common type of brake mechanism, wherein there may be two brake shoes arranged to act internally upon the brake drum at substantially diametrically opposite points, there is a tendency to distort the brake drum into an elliptical shape, and also to deflect the flange of the drum, whereby to displace the braking surface of the drum into a position angularly related to the braking surface of the brake shoes; and, as a result, the efficiency of the brake mechanism is or may be seriously reduced.

A further object of this invention is the provision of brake mechanism so arranged that the braking pressure on the brake drum are or may be approximately balanced, and distortion of the brake drum is or may be avoided, whereby the efficiency of the mechanism may be substantially enhanced.

The brake mechanism arranged to accomplish the object of the invention may include a brake drum and three or more brake shoes which are disposed substantially equi-angularly within and about the periphery of the drum and are arranged to be moved to bear at the same time upon the drum.

A further object of this invention is to provide a brake mechanism with brake segments as above described which are or may be so constructed and arranged that the wear on the surfaces thereof may be substantially uniform over their entire extent.

A further object is generally to improve the construction and operation of brake mechanisms.

This invention is disclosed but not claimed in my joint co-pending application with Wallace W. Tuttle, Serial No. 634,855, filed April 26, 1923. Part of the subject-matter herein disclosed is claimed in my divisional applications No. 329,521, filed December 31, 1928; No. 329,522, filed December 31, 1928, and No. 355,116, filed April 15, 1929.

Figure 1:
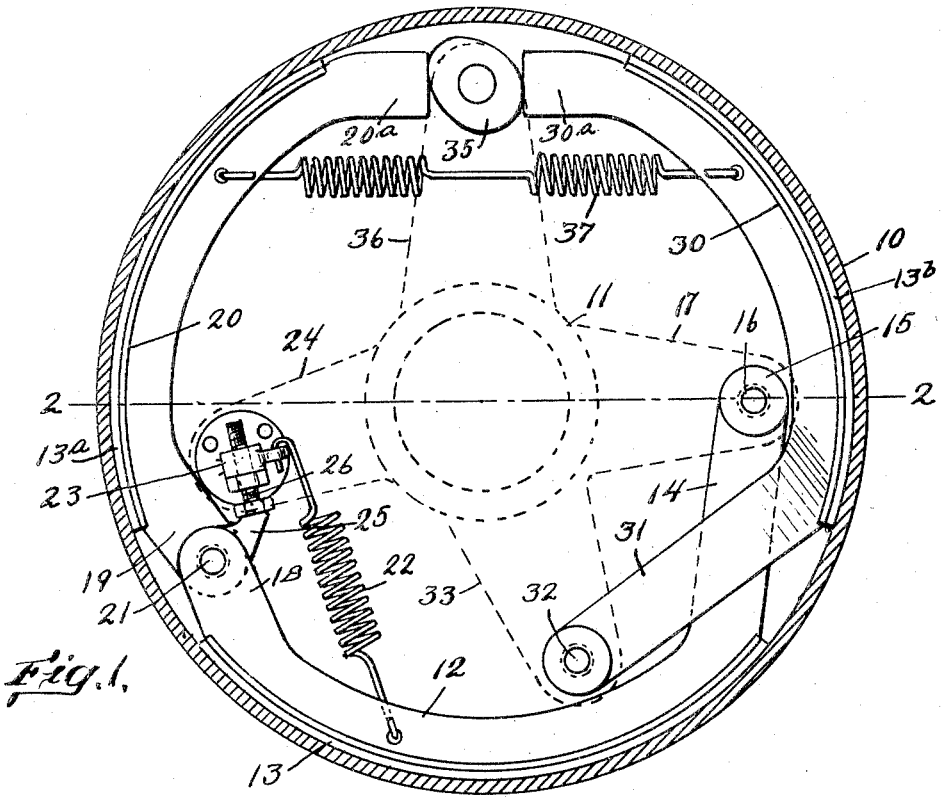
Fig. 1 is a sectional elevation of the brake mechanism embodying my invention taken along lines 1—1 of Fig. 2.
Figure 2:
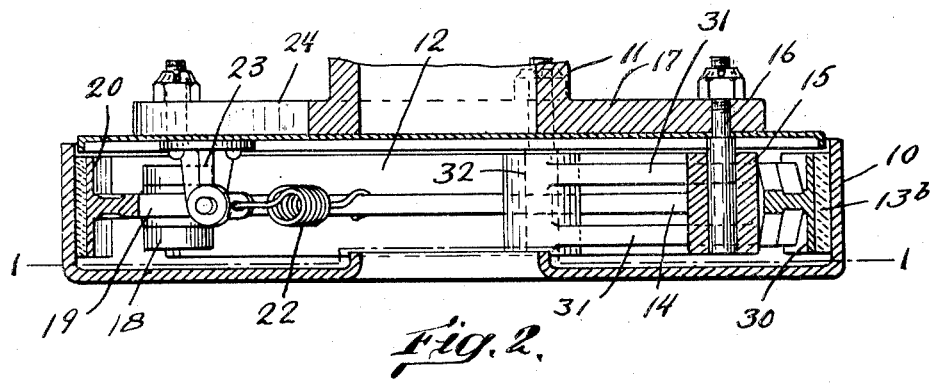
Fig. 2 is a plan view in section taken along lines 2—2 of Fig. 1.

As here shown, my invention is applied to a brake mechanism having a rotatable member comprising the brake drum 10 which may be secured to the wheel of an automobile or some other rotatable member not necessarily shown.

The relatively stationary brake members of the brake mechanism may be and preferably are disposed within said brake drum and are adapted to be moved outwardly whereby frictionally to engage the internal surface of the drum; and said brake members may be supported on a suitable fixed bracket 11. Said brake members may include a brake shoe 12 which may have a brake lining 13 of suitable friction material; and said brake shoe is adapted to be moved outwardly from a normally retracted position to force the lining thereof into frictional engagement with the brake drum 10. Said brake shoe is or may be formed or provided with an arm 14 which extends upwardly and angularly inward from one end of said shoe, and said arm may terminate in a boss 15 at the upper end thereof. A stud bolt 16 is secured to an arm 17 of said bracket 11 and extends through said boss 15 and forms means whereby said brake shoe is pivotally supported. Said brake shoe 12 is or may be also provided with a pair of spaced arms 18 at the other end thereof between which an arm 19 of a second brake or power shoe 20 is disposed and pivotally connected to said first brake shoe by the pivot pin 21. Said second brake or power shoe 20 is provided with a brake lining 13a adapted frictionally to engage the internal surface of the brake drum 10.

Means are preferably provided whereby to draw and hold the brake shoe 12 normally in a retracted position free from engagement with the brake drum 10 and said means may include a spring 22 one end of which is connected with the brake shoe 12 and the other end of which may be connected with a fixedly supported standard 23; and said standard may be suitably supported by suitable means, as an arm 24 of the bracket 11. Said brake shoe 20 may be formed or provided with a projection 25; and an adjusting screw 26 may be threaded in said standard 23 and arranged to engage said projection and define the retracted position of the brake shoe. Said brake shoe may be adjusted to compensate for wear of the lining thereof by a proper adjustment of said screw 26.

For reverse drive, and in addition to the above-described brake shoes, a third brake shoe 30 having the brake lining 13b may be provided. Said brake shoe 30 may be similar to the brake shoe 12 and may be formed, at its lower end, with two spaced arms 31 which extend on opposite sides of or overlap the arm 14 of the brake shoe 12. Said arms 31 are pivotally mounted on a stud pin 32 which is secured to an arm 33 of the bracket 11 or otherwise suitably supported in fixed position.

The brake mechanism herewith illustrated may be actuated in any suitable manner. The actuating means may comprise a cam 35 which is or may be rotatably supported on an arm 36 of said bracket 11. Said cam 35 is disposed between the proximate end portions 20a and 30a respectively of the shoes 20 and 30 and is adapted to be rotated whereby to force said brake shoes outwardly against the tension of a retractile spring 37 connecting said brake shoes and force them into frictional engagement with the brake drum 10. Said spring 37 is adapted normally to withdraw said brake shoes from engagement with the drum where said cam is restored to its normal position.

The construction and arrangement here shown provides a braking effect which is or may be greater in proportion than the force acting upon the ends of the brake shoes 20 and 30 to force them into engagement with the brake drum. When said brake or power shoe 20 is forced outwardly into frictional engagement with said drum, and when said drum is rotated in a counter-clockwise direction, the frictional engagement between said brake shoe and said drum tends to move said shoe downwardly. The downward movement of said brake shoe forces the brake shoe 12 outwardly into forcible frictional engagement with the brake drum or loads said brake shoe; and the pressure acting on said brake shoe 12 may be considerably greater than the pressure acting to hold the power shoe in engagement with the brake drum. It is thus seen that while the initial braking effort is effected through the brake actuating means, or by rotation of the cam 35, the greatest braking effect is effected by the pressure exerted on the brake shoe 12 by the power shoe 20. With this arrangement, the power required for braking is supplied largely by the moving member of the brake mechanism.

While the brake shoe 30 has considerable effect in resisting the rotation of the brake drum 10 when said drum is rotating in a counterclockwise direction, yet the rotation of said drum tends to move said brake shoe 30 away from braking engagement therewith. However, when said brake drum 10 is rotating in the reverse or clockwise direction, the rotation thereof tends to carry said brake shoe 30 along with said drum and consequently said brake shoe has its maximum braking effect when said drum rotates in a clockwise direction.

Preferably all the brake shoes are arranged in substantially the same plane within the inner periphery of the brake drum.

The location of the pivotal supports 16 and 32 for said brake shoes 12 and 30 respectively is of importance and the arrangement herewith shown is such that the entire braking face of the shoes are moved substantially the same distance into engagement with the brake drum with the result that the wear upon the brake linings is substantially uniform throughout their active extent.

Figure 3:
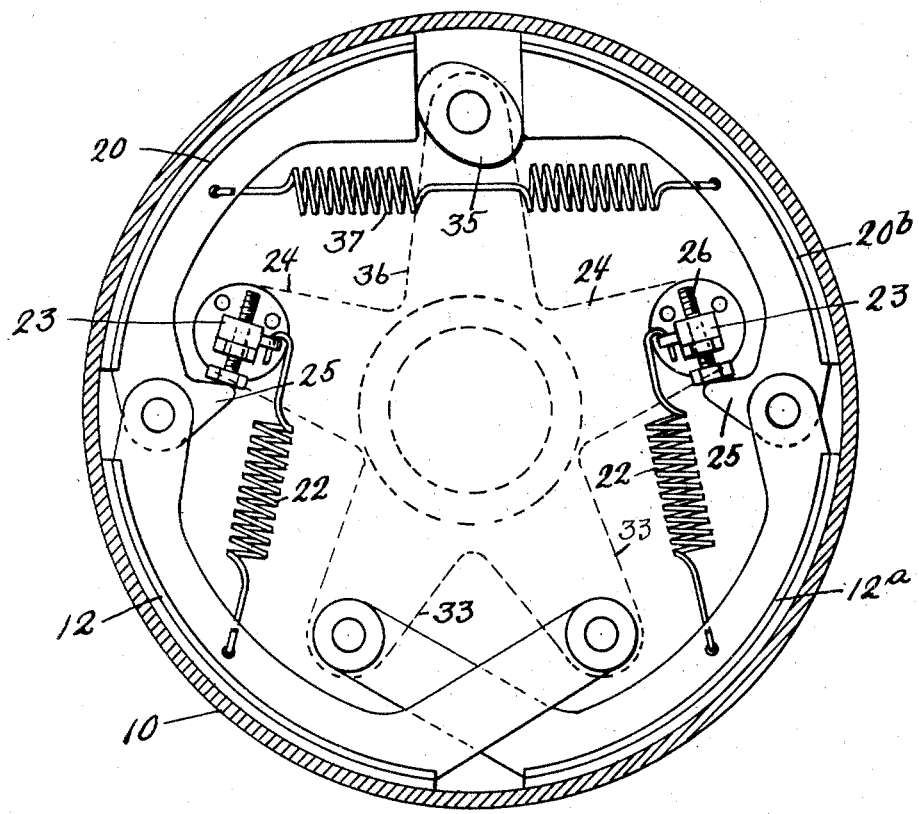
Fig. 3 is a view similar to Fig. 1 but illustrating a construction of the invention, wherein the reverse brake shoe, also, is provided with a loading shoe.

Fig. 3 illustrates a construction wherein the brake and power shoes 12 and 20 are duplicated in the similar shoes 12a and 20b on the opposite side of the brake drum so that equal braking effect may be obtained regardless of the direction of rotation of the brake drum.

The construction herewith shown may be otherwise modified without departing from the spirit of the invention.

I claim:

1. Brake mechanism comprising the combination of a rotatable drum, and three inflexible brake shoes approximately equi-distantly spaced about the circumference of said drum, two of said brake shoes having a pivotal interconnection, and one of said connected shoes having means governed by its frictional engagement with said drum to exert a pressure on the brake shoe connected therewith, said pressure-exerting shoe and said third shoe having proximate free ends, and means disposed between the proximate free ends thereof arranged to urge them outwardly and against said drum.

2. Brake mechanism comprising the combination of a rotatable drum, an inflexible brake shoe adapted to be moved into frictional engagement with said drum, and a fixed pivotal support for one end of said brake shoe disposed a substantial distance to the rear and beyond one end of the braking face of said brake shoe whereby to provide substantially uniform wear over the extent of the braking surface of said brake shoe, an inflexible power shoe pivotally supported at one end by said brake shoe arranged to be moved with said drum to apply a braking pressure to said brake shoe, and means supported independently of said power shoe arranged to engage the free end thereof to force it against said drum.

3. Brake mechanism comprising the combination of a rotatable drum, a pair of pivotally-connected and inflexible brake shoes disposed to frictionally engage said drum, one of said brake shoes having a supporting arm extended for a substantial distance beyond that end of it opposite the pivotal connection with said other brake shoe, and beyond and in the rear of the braking face of said shoe, a fixed pivotal support for the outer end of said arm, said arm and pivotal support being arranged and disposed to support said brake shoe for uniform wear of its braking face, and means to move said other brake shoe into frictional engagement with said drum, and said other brake shoe constructed and arranged by its engagement with said rotatable drum to force said pivotally supported brake shoe into frictional engagement with said drum.

4. Brake mechanism comprising the combination of a rotatable drum, a pair of pivotally-connected inflexible brake shoes disposed to frictionally engage said drum, one of said brake shoes having an arm extended for a substantial distance beyond and rearwardly of the braking face and from that end of it opposite the pivotal connection with said other brake shoe, a fixed pivotal support for the outer end of said arm, brake-operating means having a support independent of said brake shoe engageable with the free end of said other brake shoe and arranged to move it into frictional engagement with said drum, and said other brake shoe constructed and arranged by its engagement with said rotatable drum to force said pivotally supported brake shoe into frictional engagement with said drum, and a third pivotally-supported inflexible brake shoe disposed in cooperative relation with said drum and having its free end disposed in position to be operated by said brake-operating means.

5. Brake mechanism comprising the combination of a rotatable drum, a pair of pivotally-connected inflexible brake shoes disposed within said drum and adapted to engage it frictionally, one of said brake shoes having a supporting arm extended outwardly for a substantial distance away from the free end of it, a fixed pivotal support for the free end of said arm, yielding means directly connected with and arranged normally to hold said pivotally-supported brake shoe away from frictional engagement with said drum, brake-actuating means having supporting means independent of said brake shoes and arranged to engage with the free end of said second brake shoe to move it into frictional engagement with said brake drum, and said latter shoe constructed and arranged thereupon to act through its pivotal connection with said pivotally-supported brake shoe to move said pivotally-supported brake shoe into frictional engagement with said brake drum, a third pivotally supported brake shoe disposed in operative relation with said drum and having a free end disposed in position to be engaged by said brake-actuating means, and a retractile spring connecting said third shoe and said second shoe.

6. Brake mechanism comprising the combination of a rotatable drum, a pair of pivotally-connected inflexible brake shoes disposed within said drum and adapted to engage it frictionally, one of said brake shoes having an arm extended outward and for a substantial distance away from the free end of it, a fixed pivotal support for the free end of said arm, yielding means directly connected with said pivotally-supported brake shoe and arranged normally to hold it away from frictional engagement with said drum, an adjustable stop-member arranged to define the disengaged position of said pivotally-supported brake shoe, brake-actuating means engageable with the free end of said other brake shoe to move it into frictional engagement with said brake drum, and said latter brake shoe constructed and arranged thereupon to act through its pivotal connection with said pivotally-supported brake shoe to move said pivotally-supported brake shoe into frictional engagement with said brake drum.

7. Brake mechanism comprising the combination of a rotatable drum, an inflexible power shoe and an inflexible brake shoe disposed in approximately peripheral alignment to engage said drum frictionally, means pivotally connecting the proximate ends of said shoes, said brake shoe having an arm extended outwardly and angularly and for a substantial distance away from one end of the drum-engaging face of the shoe, and a fixed pivotal support for the end of said arm so arranged that the drum-engaging face of said shoe may wear substantially uniformly over its extent, and brake-actuating means arranged to act on the free end of and move said power shoe into frictional engagement with said rotatable drum, and said power shoe constructed and arranged thereupon to be moved by said drum to apply a braking pressure on said brake shoe.

8. Brake mechanism comprising the combination of a rotatable drum, an inflexible brake shoe arranged for frictional engagement with said drum and having an arm extended outwardly and angularly and for a substantial distance from one end thereof, a fixed pivotal support for the end of said arm, said brake shoe and pivotal support arranged to provide for substantially uniform wear of said shoe over the extent of its drum-engaging face, an inflexible power shoe pivotally-connected at one end with the free end of said brake shoe, a third and pivotally supported brake shoe disposed opposite said power shoe, brake-actuating means arranged to engage the free end of said third brake shoe and also to engage the free end of said power shoe and move it into frictional engagement with said rotatable drum, whereby to load said brake shoe, and urge it forcibly against said rotatable drum, yielding means connected directly with said first brake shoe and arranged to urge it toward a retracted position, other yielding means connected directly with said power shoe and said third brake shoe and arranged to urge them toward a retracted position, and means to limit the retractive movement of said first brake shoe and said power shoe.

9. Brake mechanism comprising the combination of a rotatable drum, an inflexible brake shoe arranged for frictional engagement with said drum and having an arm extended outwardly and angularly and for a substantial distance from one end thereof, a fixed pivotal support for the end of said arm, said brake shoe and pivotal support arranged to provide for substantially uniform wear of said shoe over the extent of its drum-engaging face, an inflexible power shoe pivotally connected at one end with the free end of said brake shoe, brake-actuating means arranged to engage the free end of said power shoe and move it into frictional engagement with said rotatable drum, whereby to load said brake shoe and urge it forcibly against said rotatable drum, yielding means connected directly with said brake shoe and arranged to urge it toward a retracted position, other yielding means connected directly with said power shoe and arranged to urge it toward a retracted position, and means to limit the retractive movement of said shoes including a projection carried by said power shoe at that end pivotally connected with said brake shoe, a fixed standard, and an adjusting member adjustably carried by said standard and arranged to engage said projection.

10. Brake mechanism comprising the combination of a rotatable brake drum, two inflexible brake shoes disposed within said drum in substantially the same circumferential path and having overlapping inwardly directed arms, independent fixed pivotal supports for the ends of said arms, an inflexible power shoe disposed within said drum in substantially the same circumferential path with said brake shoes and having pivotal connection with an adjacent brake shoe remote from its fixed pivotal support, and brake-actuating means arranged to engage the proximate ends of said power shoe and the remaining brake shoe and move them into engagement with said rotatable drum, said power shoe arranged to load its connected brake shoe.

11. Brake mechanism comprising the combination of a rotatable brake drum, two inflexible brake shoes disposed within said drum in substantially the same circumferential path, an inflexible power shoe disposed within said drum in substantially the same circumferential path with said brake shoes and having pivotal connection with an adjacent brake shoe, and brake-actuating means arranged to engage the proximate ends of said power shoe and the remaining brake shoe and move them into engagement with said rotatable drum, said power shoe arranged to load its connected brake shoe.

12. A brake comprising, in combination, a drum, a rigid friction-faced shoe inside the drum and mounted on a fixed pivot and extending around approximately 120° of the drum, a jointed friction faced member including a pair of pivotally-connected rigid friction-faced shoes mounted on a fixed pivot adjacent the pivot of the first shoe, and means at the free ends of the first shoe and the jointed member for swinging the three shoes against the inside of the drum.

13. In brake mechanism, for engaging a rotatable drum, a plurality of articulated brake shoes having a relatively fixed pivot for one end shoe, an independent brake shoe and a relatively fixed pivot therefor, and means for moving the plurality of shoes as well as the independent shoe into contact with the drum.

14. In brake mechanism for engaging a rotatable drum, a plurality of articulated brake shoes having a relatively fixed pivot for one end shoe, an independent brake shoe and a relatively fixed pivot therefor, and means for moving the articulated shoes in a direction corresponding to the normal rotation of the drum and for moving the independent shoe in the opposite direction into engagement with the drum.

15. In brake mechanism for engaging a rotatable drum, a self-energizing brake, an independent brake, and means for causing both brakes to engage said drum.

16. In brake mechanism for engaging a rotatable drum, a self-energizing brake, consisting of articulated primary and secondary shoes, said secondary shoe having a fixed pivot, an auxiliary brake shoe having its own pivot, and means engaging the primary shoe and the auxiliary shoe for moving them into contact with the drum.

17. In brake mechanism for engaging a rotatable drum, a self-energizing brake, consisting of articulated primary and secondary shoes, an auxiliary brake shoe, said secondary shoe and auxiliary shoe having substantially fixed anchor points for the purposes described, and means for moving all of said shoes into contact with the drum.

18. In brake mechanism for engaging a rotatable drum, a compound brake shoe consisting of a primary shoe and a secondary shoe jointed thereto, a single independent shoe, and means positioned between the free ends of the single shoe and of the primary shoe of the compound brake shoe for forcing the shoes against the drum.

19. In brake mechanism for engaging a rotatable drum, a compound brake shoe having self-wrapping characteristics in the normal direction of rotation of the drum composed of a plurality of articulated shoes anchored at one end shoe, an auxiliary brake shoe without said characteristics, and means for causing said brakes to engage the drum.

20. In brake mechanism for engaging a rotatable drum, a pair of brake shoes at least one of which possesses self-energizing characteristics for one direction of rotation of the drum while the other shoe is direct acting, and means for causing said shoes to engage the drum.

21. A brake comprising, in combination, a drum, a central shoe, an end shoe at each end of the central shoe, means for forcing the end shoes against the drum, and means operated by one of the end shoes for forcing the central shoe against the drum.

22. A brake comprising, in combination, a drum, a central shoe anchored at one end within the drum, an end shoe within the drum at each end of the central shoe, means for forcing the end shoes apart against the drum, and means operated by one of the end shoes for swinging the central shoe about its anchored end against the drum.

23. A brake comprising, in combination, a drum, a central shoe and a pair of end shoes, one at each end of the central shoe, a stationary support, means operated by one end shoe for forcing the central shoe against the drum, a spring connecting the support and the central shoe, and another spring connecting the two end shoes.

24. A brake comprising, in combination, a drum, a central shoe and an end shoe at each end of the central shoe, all arranged within the drum, means for forcing the end shoes apart against the drum, means operated by the first end shoe for forcing the central shoe against the drum, and means yieldingly urging the three shoes away from the drum.

25. A brake comprising, in combination, a drum, a central shoe and an end shoe at each end of the central shoe, all arranged within the drum, means for forcing the end shoes apart against the drum, means operated by the first end shoe for forcing the central shoe against the drum, and means yieldingly urging the three shoes away from the drum including a spring connecting the end shoes.

26. A brake comprising, in combination, a drum, a central shoe and an end shoe at each end of the central shoe, all arranged within the drum, means for forcing the end shoes apart against the drum, means operated by the first end shoe for forcing the central shoe against the drum, and means yieldingly urging the three shoes away from the drum including a spring connecting the end shoes and another spring connected to the central shoe.

27. A brake comprising, in combination, a drum, a shoe anchored at one end within the drum, an unanchored shoe arranged at the unanchored end of the anchored shoe, a third shoe anchored within the drum and having its unanchored end adjacent the end of the unanchored shoe, each of the shoes being approximately 120° in length, means for forcing the adjacent ends of the third shoe and of the unanchored shoe apart against the drum, and means operated by the unanchored shoe for forcing the first anchored shoe against the drum.

28. A brake comprising, in combination, a drum, a shoe anchored at one end within the drum, an unanchored shoe arranged at the unanchored end of the anchored shoe, a third shoe anchored within the drum and having its unanchored end adjacent the end of the unanchored shoe, means for forcing the adjacent ends of the third shoe and of the unanchored shoe apart against the drum, and a pivot connecting the adjacent ends of the unanchored shoe and the first anchored shoe and operated by the unanchored shoe to force the first anchored shoe against the drum.

29. A brake comprising, in combination, a drum, a shoe anchored at one end within the drum, an unanchored shoe arranged at the unanchored end of the anchored shoe, a third shoe anchored within the drum and having its unanchored end adjacent the end of the unanchored shoe, a spring urging the first anchored shoe away from the drum, means for forcing the adjacent ends of the third shoe and of the unanchored shoe apart against the drum, and means operated by movement of the unanchored shoe with the drum for thereafter forcing the first anchored shoe against the drum.

30. A brake comprising, in combination, a drum, a pair of shoes anchored at their adjacent ends, an unanchored shoe connected to the unanchored end of the first of the pair of shoes, a stop, a spring holding said first shoe yieldingly in an idle position determined by the stop, and means for forcing the unanchored shoe and the second of the pair of shoes against the drum, the unanchored shoe thereupon moving circumferentially of the drum to force the first of the pair of shoes against the drum against the resistance of the spring.

31. A brake comprising, in combination, a drum, a pair of shoes anchored at their adjacent ends, an unanchored shoe connected to the first of the anchored shoes, a stop, a spring holding the unanchored shoe yieldingly against the stop, and means for forcing the unanchored shoe and the second anchored shoe against the drum, the unanchored shoe forcing the first anchored shoe against the drum.

32. The combination with a self-assisting braking mechanism comprising a rotary drum, two shoes mounted for frictionally engaging the drum, the first of said shoes being adapted to partake to a limited extent of the rotary movement of the drum, the second shoe being secondarily applied by said rotary movement of the first shoe, and an actuating member for primarily applying the first shoe, of a third shoe also applied by said member and held against movement with the drum in either direction, whereby the third shoe is instantaneously effective upon actuation of said member when the drum is rotated in either direction.

33. In brake mechanism for engaging a rotatable drum, a compound brake shoe consisting of articulated primary and secondary shoes, a single pivoted brake shoe and means for moving both brakes into engagement with the drum, said secondary shoe having a relatively fixed pivot more remote from the joint between the primary and secondary shoes of the compound brake, than the pivot for said single brake shoe.

34. In brake mechanism for engaging a rotatable drum, a compound brake shoe consisting of a primary shoe and a secondary shoe jointed thereto, a single independent shoe and a two faced cam positioned between the free ends of the single shoe and of the primary shoe of the compound brake shoe for the purpose described.

35. In brake mechanism for engaging a rotatable drum, a self energizing brake, an independent brake, means for causing both brakes to engage said drum, both said brakes having anchor points arranged in overlapping relationship as described.

36. In brake mechanism for engaging a rotatable drum, a pair of brake units at least one of which is composed of a plurality of articulated shoes and means for causing said units to engage the drum, one of the units being anchored between the ends of the other.

37. In brake mechanism for engaging a rotatable drum, means for preventing deformation of said drum comprising a plurality of brake shoes, having at least two shoes separately anchored and overlapping near their anchorage points and a third shoe applying at least one of the overlapped shoes.

38. In brake mechanism for engaging a rotatable member, comprising a pair of overlapping brake shoe units, at least one of said units consisting of two articulated shoes, and an adjustable stop for controlling the clearance of said articulated shoes with respect to the rotatable member.

39. A brake comprising, in combination, a pair of shoes having strengthening webs, the webs being differently arranged with respect to the center lines of the shoes at their adjacent ends and projecting past each other to overlap the shoes, and means for simultaneously applying the two shoes including a third shoe acting on at least one of the pair of shoes.

40. A brake comprising, in combination, a pair of shoes having strengthening webs, the webs being differently arranged with respect to the center lines of the shoes at their adjacent ends and projecting past each other to overlap the shoes, means for anchoring one of the overlapping shoes between the ends of the other shoe, and means including another shoe for jointly applying the shoes.

41. A brake comprising three shoes arranged generally end to end and at least two of which overlap each other, in combination with means through which one shoe acts to apply at least one of the other shoes.

42. A brake comprising, in combination, a T-section shoe having spaced-apart parallel strengthening webs at its end, an adjacent shoe having its end straddled by the parallel webs of the first shoe, means for anchoring one of the shoes between the ends of the other, and means for applying the two shoes.

43. A brake comprising a plurality of jointly-operable shoes having adjacent movable ends and one of which has spaced arms at its end straddling the end of the other shoe to overlap the shoes, in combination with means for taking braking torque from the overlapped end of one of the shoes and expanding means engaging said movable ends and forcing them apart.

44. A brake comprising a pair of jointly-operable anchored shoes overlapping at their anchored ends, and means for applying both shoes substantially together including a floating servo shoe.

45. A brake comprising a pair of jointly-operable overlapping shoes, and means for applying both shoes substantially together including a floating shoe and a connection from the floating shoe to at least one of the overlapping shoes.

46. A brake comprising a pair of shoes, one of which is substantially T-shaped in section throughout and the other of which is T-shaped in section for most of its length and is forked at its end and is arranged to straddle the end of the first shoe.

47. In brake mechanism for engaging a rotatable member, brake shoes and a double cam for actuating said shoes, the end of the cam acting against one shoe being longer than the end acting against the other shoe.

48. In brake mechanism for engaging a rotatable member, brake shoes having different braking characteristics for a given rotation of said rotatable member, and a non-floating cam for actuating said shoes, said cam being operated eccentrically so as to tend to balance the forces applied to its opposite sides through said shoes.

49. In brake mechanism for engaging a rotatable member including brake shoes and having free ends, a two faced cam positioned between the free ends of said shoes, said cam faces being assymmetrically disposed with respect to the turning axis of said cam as and for the purposes described.

In testimony whereof, I have signed my name to this specification.

ERIK HIRVONEN.